March 19, 1963 R. C. VAN SICKLE ETAL 3,082,355
CIRCUIT INTERRUPTER
Filed Dec. 24, 1956 6 Sheets-Sheet 1

WITNESSES:

INVENTORS
Roswell C. Van Sickle, Fritz E. Florschutz
and Joseph Sucha.
BY
ATTORNEY March 19, 1963 R. C. VAN SICKLE ETAL 3,082,355
CIRCUIT INTERRUPTER
Filed Dec. 24, 1956 6 Sheets-Sheet 2
Fig. 2.
Fig. 3.
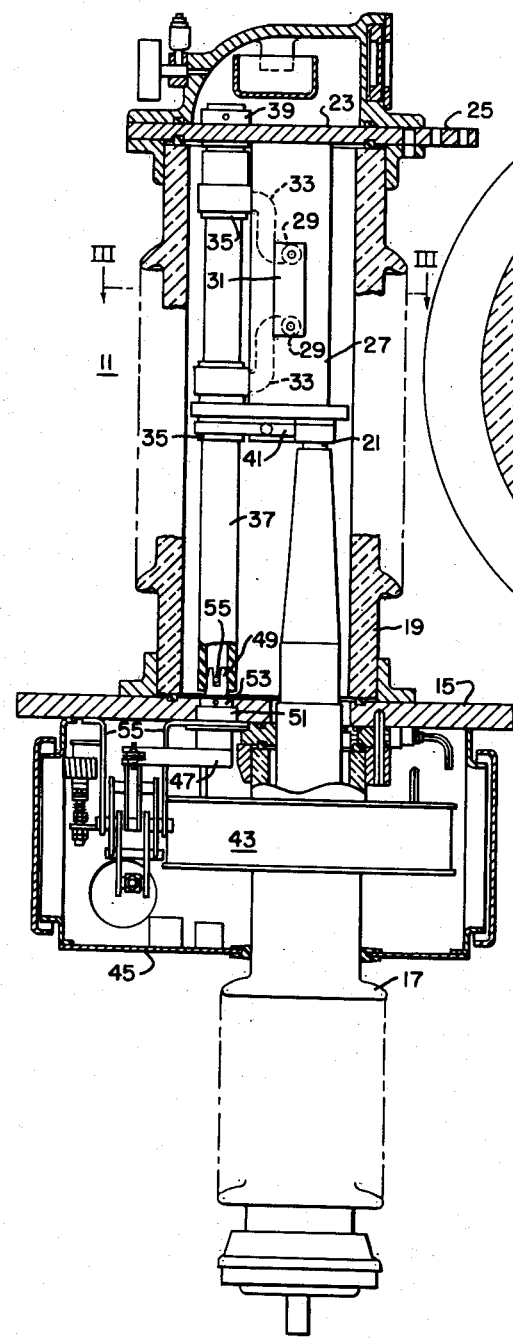
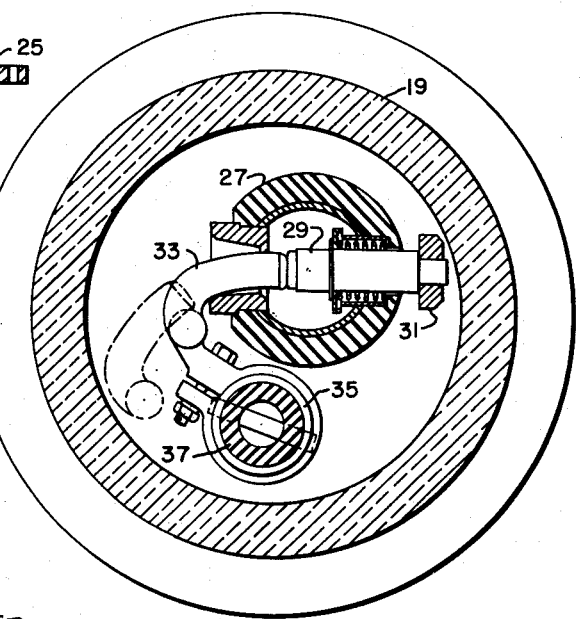

March 19, 1963  R. C. VAN SICKLE ETAL  3,082,355
CIRCUIT INTERRUPTER
Filed Dec. 24, 1956

March 19, 1963 R. C. VAN SICKLE ETAL 3,082,355
CIRCUIT INTERRUPTER

Filed Dec. 24, 1956

6 Sheets-Sheet 4

United States Patent Office 3,082,355
Patented Mar. 19, 1963

3,082,355
CIRCUIT INTERRUPTER
Roswell C. Van Sickle, Wilkinsburg, Fritz E. Florschutz, Forest Hills, and Joseph Sucha, Port Vue, McKeesport, Pa., assignors to Westinghouse Electric Corporation, East Pittsburgh, Pa., a corporation of Pennsylvania
Filed Dec. 24, 1956, Ser. No. 630,304
5 Claims. (Cl. 317—22)

This invention relates to circuit interrupters and more particularly to operating mechanisms for circuit interrupters.

Under certain conditions, it is advantageous to control a polyphase electric power transmission system by selective operation of one or more of the phase interrupters which comprise the polyphase circuit interrupter. This selective control, known as single-phase switching, may be of particular value in maintaining service continuity in case of a temporary single-phase-to-ground fault or even a phase-to-phase fault. When a conventional multipole circuit interrupter, in which the several pole units are arranged for unitary operation by a common operating mechanism, is used to control a polyphase circuit, all poles are simultaneously opened in response to a fault occurring in any one of the phase circuits, thus completely interrupting the service. It is possible, however, by the use of single-phase or selective-phase switching to interrupt only the phase or phases in which the fault occurs. The load may be partially carried on the remaining phases for a limited time, thus maintaining the supply of energy.

An object of the invention is to provide a multiphase circuit interrupter wherein only the phase circuit interrupter unit associated with a faulted phase is initially tripped open in response to a fault condition and is automatically reclosed.

Another object of the invention is to provide a multipole circuit interrupter embodying independently operable phase circuit interrupters which are individually tripped open initially in response to fault conditions on their associated phase conductors and a single closing means for automatically reclosing any phase interrupter that has been tripped open.

Another object of the invention is to provide a multiphase circuit interrupter according to the preceding paragraphs wherein each phase circuit interrupter is mechanically trip-free of the single closing means.

Another object of the invention is to provide a multiphase circuit interrupter embodying an improved operating mechanism wherein a trip-free means is provided for operatively relating the individual phase circuit interrupters to the common closing means so that each phase interrupter is mechanically trip-free of the closing means when closed against a faulted line.

Another object of the invention is to provide a multiphase circuit interrupter according to the preceding objects in which the trip-free means is reset and ready for a closing operation at least by the time the phase circuit interrupter has reached its fully open position.

The invention both as to structure and operation, together with additional objects and advantages thereof, will be best understood from the following detailed description thereof when read in conjunction with the accompanying drawings.

In said drawings:

FIG. 2 is an enlarged vertical sectional view taken through one of the pole units of the circuit interrupter;

FIG. 3 is a horizontal sectional view taken on line III—III of FIG. 2 and looking in the direction indicated by the arrows;

Figure 1:
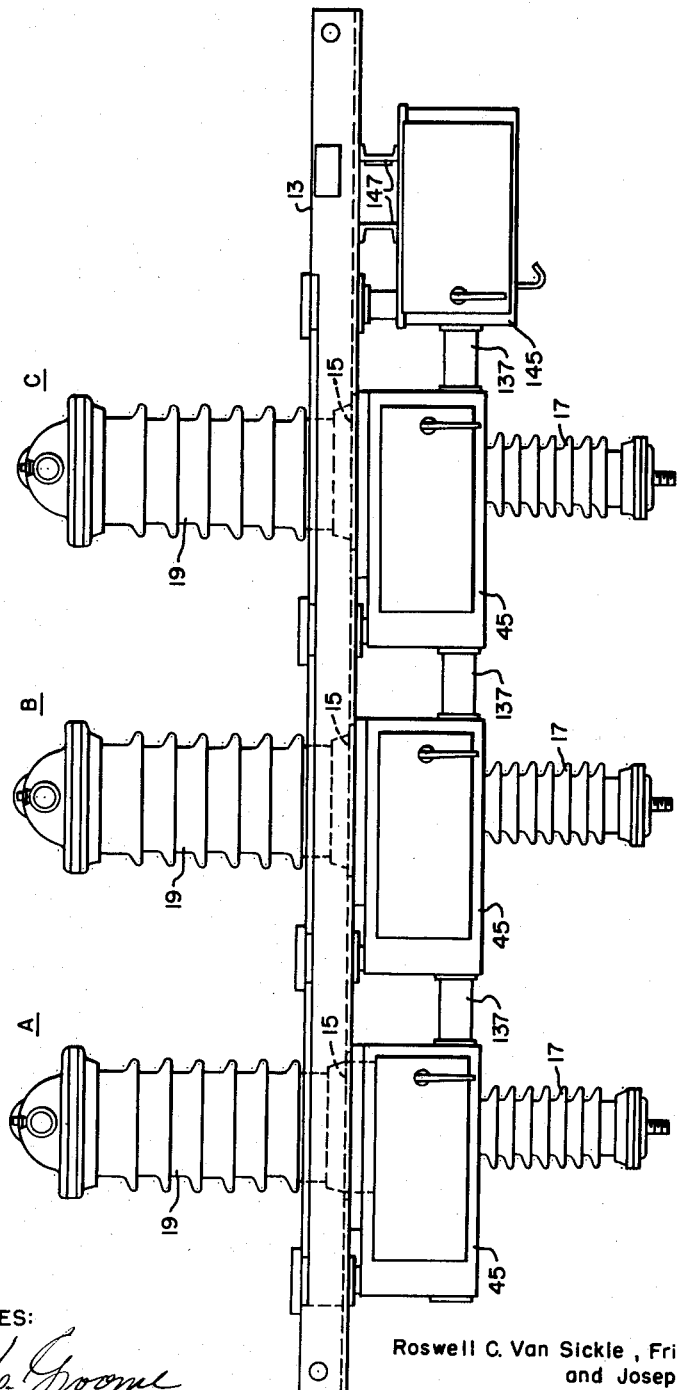
FIGURE 1 is a front elevational view of a three-pole circuit interrupter embodying the principles of the invention.

Referring to FIG. 1 of the drawings, the circuit interrupter comprises generally three separate but identical pole units or phase interrupters designated as A, B and C supported on a frame comprising spaced angular members 13 (only one being shown) rigidly formed at each pole unit or phase interrupter by support plates 15. Since the pole units are identical only one of them is described herein.

As shown in FIGS. 1 and 2, each of the pole units comprises generally a terminal bushing 17 which may be of the condenser type and an insulating interrupter casing 19. The bushing 17 is secured to the underside of the support plate 15 and the interrupter casing is securely mounted on the upper side of the support plate. Extending through the bushing 17 and into the casing 19 is a conducting rod 21 the lower end of which forms a terminal for connecting the pole unit in an electrical circuit. A terminal plate 23 of conducting material rigidly supported adjacent the upper end of the interrupter casing 19 has a portion 25 which forms a thermal for connecting the pole unit in an electrical circuit.

A tubular arc extinguisher 27 has a pair of spaced stationary contacts 29 movably mounted therein. The contacts 29 extend out through openings in the wall of the tubular arc extinguisher 27 and are connected outside the arc extinguisher by a conducting bar 31.

A pair of spaced movable contact members 33 (FIGS. 2 and 3) cooperates with the stationary contacts 29 to open and close the circuit. The movable contacts 33 are rigidly clamped to conducting sleeves 35 surrounding a tubular insulating contact shaft 37 the upper end of which extends through an opening in the plate 23 and is rotatably supported on the plate by a thrust bearing 39 secured to the upper end of the shaft 37 above the plate 23. Pressure contacts 41 (only one being shown) disposed one on each side of the conducting rod 21 and the conducting sleeve 35 are provided to electrically connect conductor 21 to the sleeve 35 and to the lower movable contact 33. The upper movable contact 33 and the upper sleeve 35 are similarly electrically connected to the plate 23 by means of a pressure contact device (not shown).

The pole units or phase interrupters are fully described and claimed in application Serial No. 609,915, filed September 14, 1956, by Robert E. Friedrich, and assigned to the assignee of the instant application.

The contacts are opened by counterclockwise rotation of the shaft 37 as viewed in FIG. 3, and are closed by clockwise rotation of the shaft from the open position. The shaft 37 is rotated in both directions by means of an operating mechanism indicated generally at 43 (FIGS. 2, 4, 5, 6 and 7), there being an operating mechanism 43 for each of the phase interrupters. The operating mechanism 43 for each pole unit 19 is enclosed in a housing 45 (FIGS. 1 and 3) rigidly attached to and supported by the frame 13. As shown in FIG. 2, a crank arm 47 is secured to the lower end of a short shaft 49 supported for rotation in a bearing 51 rigidly secured to the support plate 15. The shaft 49 is supported in the bearing 51 by means of a thrust bearing 53 secured to the short shaft above the bearing. The upper end of the short shaft 49 is bifurcated and embraces a pin 55 in the tubular contact shaft 37 to transmit the rotary motion of the crank arm 47 to the tubular shaft 37.

The operating mechanism 43 is supported within the housing 45 between a pair of spaced frame members 55 (FIGS. 2 and 7) which are rigidly secured to the underside of the support plate 15. The frame members 55 are joined by cross members or brackets 57, 59 and 61 to form a rigid framework for supporting the operating mechanism.

The free end of the crank arm 47 is pivotally connected by means of a pin 63 to one end of an adjustable link 65 the other end of which is pivotally connected to a spring guide 67 by a pin 69. A reduced portion 71 of the spring guide 67 extends through an opening in a spring seat 73 mounted in an extension 75 of the bracket 57. A powerful accelerating spring 77 compressed between the spring seat 73 and a collar 79, the spring guide 67, through the link 65 biases the crank arm 47 and, hence, the contact shaft 37 (FIG. 3) in counterclockwise or opening direction. The contact operating structure is normally latched in the closed position against the bias of the spring 77 by the operating mechanism 43.

Referring to FIGS. 4, 5, 6 and 7 of the drawings the operating mechanism for each of the pole units is alike and includes a trip-free lever 81, comprising a pair of spaced levers, pivotally supported between its ends on the upper end of a closing lever 83 by means of a rod 85. The closing lever 83 also comprises a pair of spaced levers individually pivoted on pins 87 supported in the spaced frame members 55 and in brackets 88 secured to the frame members. Also pivotally supported on the pins 87 is a pair of spaced operating levers 89 which at their lower ends are pivotally connected by means of a pin 91 to an operating tension rod structure indicated generally at 93. A rod 95 mounted in and extending between the operating levers 89 is adapted to engage surfaces 97 on the lower ends of the closing levers 83 upon operation of the rod structure 93 to close the phase interrupters as will be more fully described later.

The closing lever 83 is biased in a clockwise direction about its pivot 87 by a pair of retrieving springs 99 tensioned between the rod 85 and the bracket 61 but is normally held in its retracted or closed position by a latch 101 pivoted on a rod 103 supported in the spaced frame members 55 and biased to latching position by a spring 105. The trip-free lever 81 is releasably restrained in its retracted or closed position by means of a pivoted latch 107 supported on a pin 109 in the frame members 55. The latch 107 is biased by a spring 111 to latching position where it is engaged by a latch roller 113 on the lower end of the trip-free lever 81. A stop 115 is provided to arrest the latch 107 in latching position.

Figure 4:
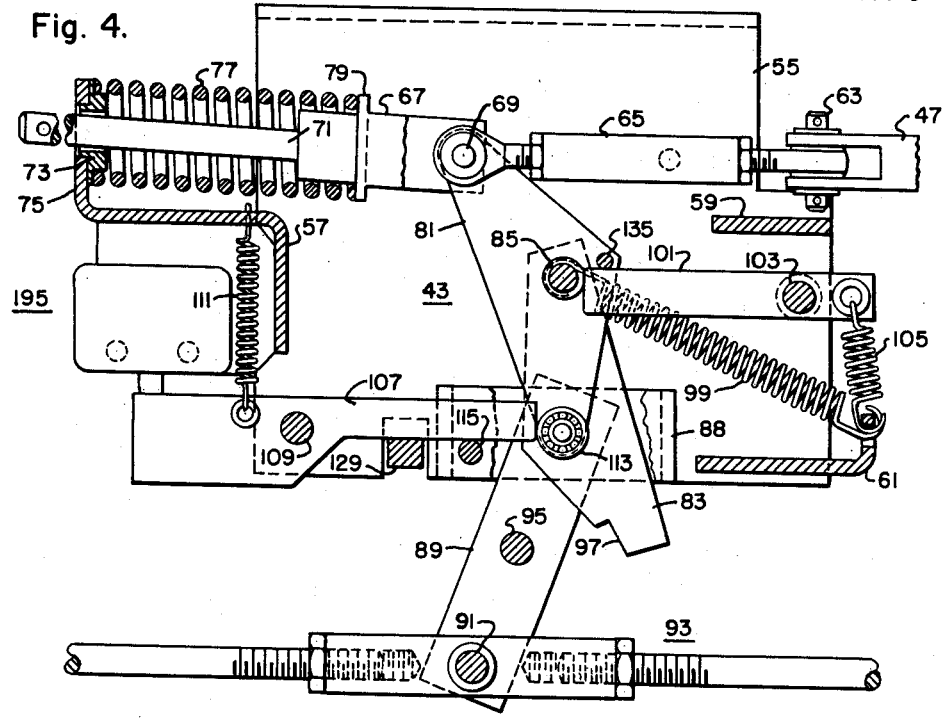
FIG. 4 is an elevational view partly in section showing the operating mechanism for one of the phase interrupters, the mechanism being shown in the closed position of the interrupter.
Figure 7:
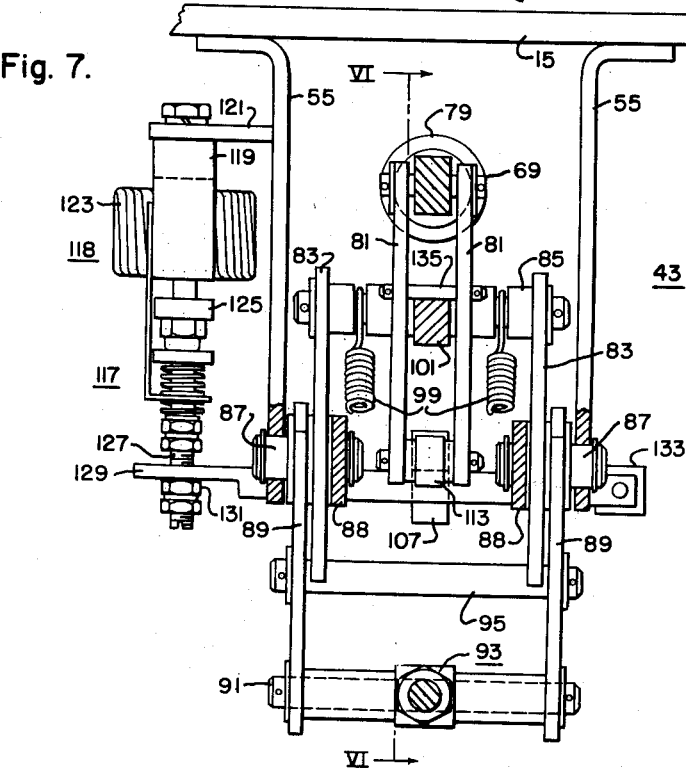
FIG. 7 is an end elevational view of the operating mechanism.

It will be understood that there is an operating mechanism, as shown in FIG. 4, for phase interrupters A, B and C mounted in the housings 45 and connected as shown to the crank arm 47 for the associated pole unit or phase interrupter. Each of the operating mechanisms is trip-free of the closing rod structure 93 and is provided with its own trip device indicated generally at 117 (FIG. 7).

The trip device 117 comprises an electromagnet 118 having an E-shaped magnet yoke 119 rigidly supported on a bracket 121 secured to the adjacent frame members 55, an energizing coil 123 and a movable armature 125. Attached to and extending downward from the armature 125 is a trip rod 127 the lower end of which extends through an opening in one end of a trip lever 129 and has a nut 131 threaded onto the lower end thereof below the trip lever 129. The trip lever extends transversely of the operating mechanism just below the latch 107 (FIGS. 4, 5 and 6) and is pivotally supported on a bracket 133 secured to the right-hand frame members 55 (FIG. 7).

Figure 5:
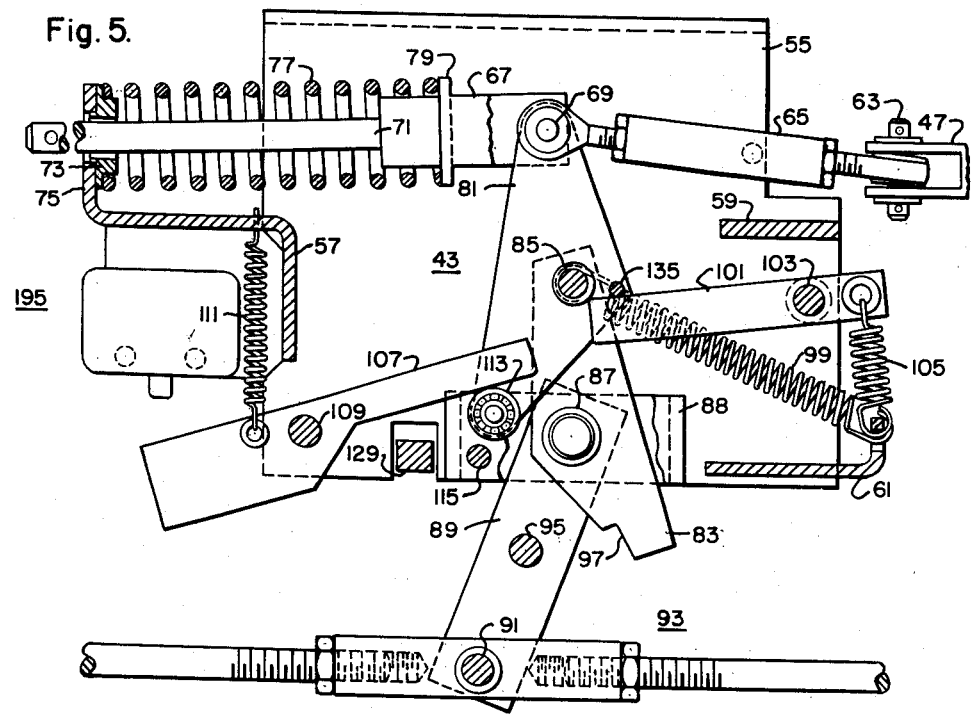
FIG. 5 is a view similar to FIG. 4 but showing the mechanism in the position it assumes at the instant the closing lever is released.
Figure 6:
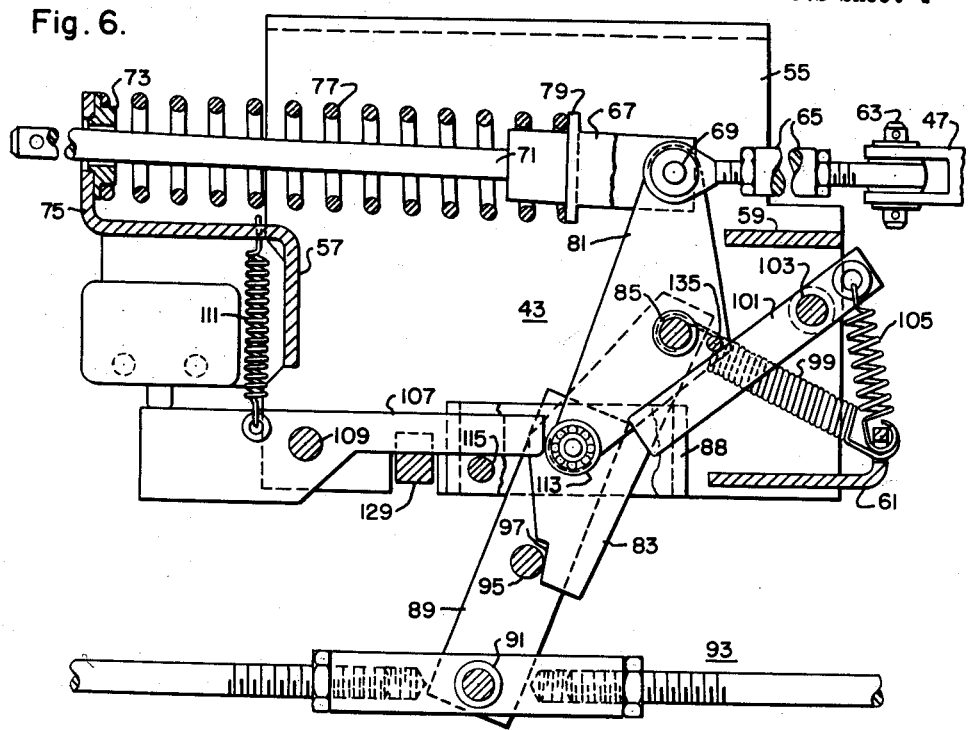
FIG. 6 is a view similar to FIGS. 4 and 5 but showing the mechanism in the fully open position.

When the tripping electromagnet 118 is energized the armature 125, together with the trip rod 127, is drawn upward turning the trip lever 129 clockwise about its pivot on the bracket 123. This action disengages the latch 107 from the latch roller 113 on the lower end of the trip-free lever 81 whereupon the powerful accelerating spring 77, acting through the link 65 and a crank arm 47, rotates the contact shaft 37 (FIGS. 2 and 3) counterclockwise as viewed in FIG. 3, to open the contacts. During this movement, due to the connection 69, the trip-free lever 81 rotates clockwise about its pivot 85 on the upper end of the closing lever 83 until a pin 135 (FIGS. 4–7) carried by the spaced trip levers 81 disengages the latch 101 from the pin 85 thus releasing the closing lever 83. The parts are shown in FIG. 5 in the positions they assume at the instant the pin 85 is unlatched. After the closing lever 83 is released the accelerating spring 77 continues the opening movement and at the same time the retrieving springs 99 rotate the closing lever clockwise about its pivot 87, carrying the pivot 85 for the trip-free lever therewith, toward the position shown in FIG. 6 which is the fully open position of the phase interrupter. The compound movement of the trip-free lever 81 from the position shown in FIG. 5 toward that in which it is shown in FIG. 6 causes the trip-free lever 81 to rotate in a counterclockwise direction about the pin 69. This movement of the trip-free lever carries the latch roller 113 on the lower end thereof from beneath the latch 107 whereupon the latch spring 111 restores the latch to latching position in the path of the latch roller 113. It will thus be seen that the mechanism is relatched and in readiness for a closing operation at least by the time the interrupter reaches the fully open position. The clockwise movement of the closing lever 83 carries the surface 97 into contact with the rod 95 on the operating lever 89 which acts as a stop to limit the opening movement of the mechanism.

The parts are shown in FIG. 6 in the fully open position of the interrupter and with the trip-free lever 81 in its retrieved and relatched position. It will be noted that the latch roller 113, the pivots 87 for the closing lever 83 and the operating lever 89 are in axial alignment, hence, when the operating rod structure 93 is moved toward the right (FIG. 6) the levers 81, 83 and 89 act as a single lever to close the interrupter. Movement of the rod 93 toward the right acts through the lever 89 and rod 95 to rotate the lever 83 counterclockwise. The lever 83 carries the pivot 85 of the lever 81 counterclockwise therewith, and since the lower end of the lever 81 is restrained by the latch 107, the link 65 is moved toward the left to the position shown in FIG. 4 rotating the crank arm 47 and the contact shaft 37 (FIG. 3) clockwise to close the contacts. As the lever 83 arrives at the position shown in FIG. 4 the spring 105 moves the latch 101 into latching position to hold the mechanism in the closed contact position.

Figure 8:
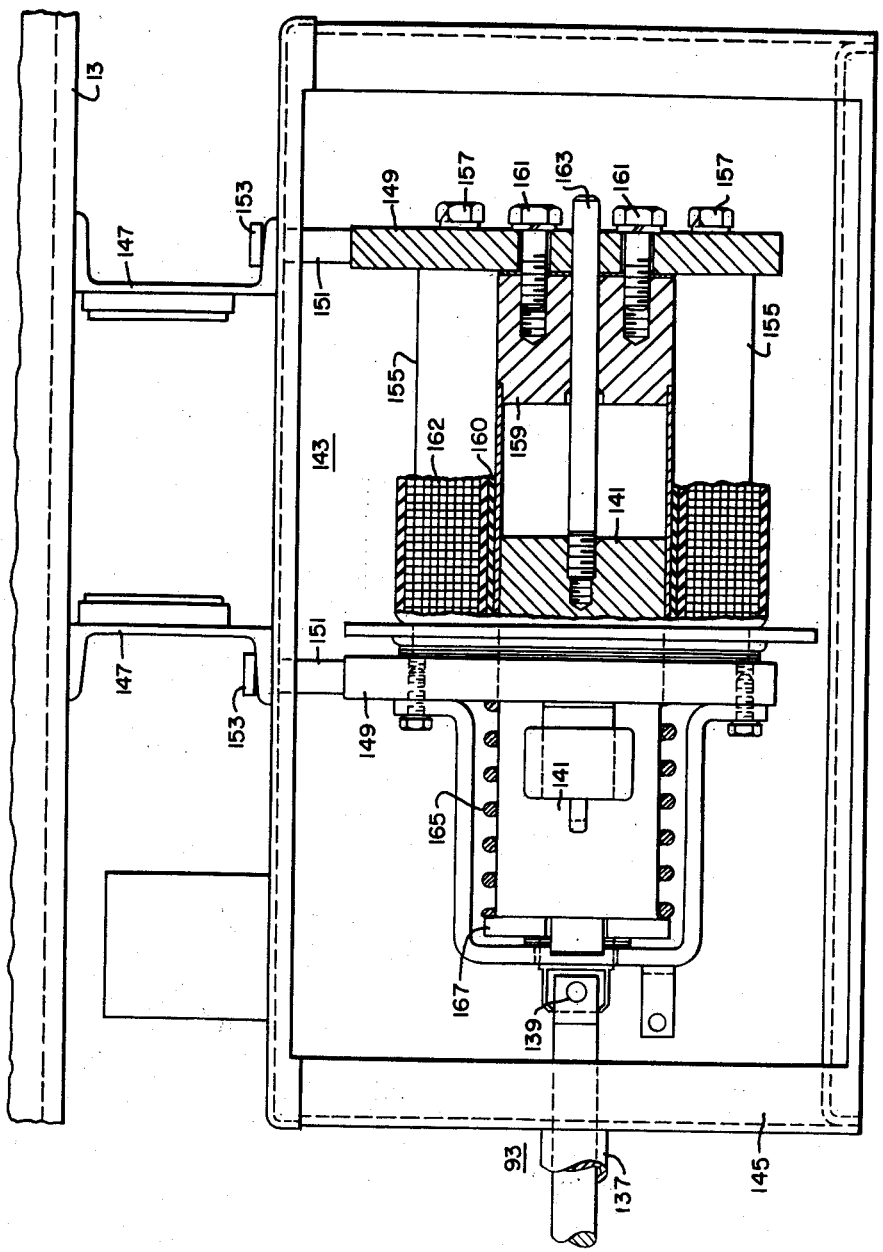
FIG. 8 is an enlarged vertical sectional view of the closing solenoid.

The operating or closing rod structure 93 extends through each of the housings 45 (FIG. 1) and through tubular closures 137 between the housings and is connected to the operating lever 89 of the operating mechanism for each phase interrupter. The right-hand end of the operating rod structure 93 is connected by means of a pin 139 (FIG. 8) to the moving armature 141 of a closing solenoid 143. The closing solenoid 143 is mounted in a housing 145 (FIGS. 1 and 8) which is supported by spaced angular brackets 147 rigidly secured to the undersides of the frame member 13. The solenoid itself comprises a pair of spaced end plates 149 mounted by means of spacers 151 and bolts 153 on the brackets 147. The end plates 149 are spaced apart by spacers of magnetic material 155 (only two of which are shown) and bolts 157 which extend through openings in the end plates 149 and into the spacers 155. A stationary core member 159 is rigidly secured to the right end plate 149 by means of bolts 161. An energizing coil 162 is supported on an insulating tube 160 surrounding the armature 141 and the stationary core member 159. The movable armature 141 extends through an opening in the left end plate 149 and has a guide rod 163 secured to its right end which extends through openings in the stationary core member and in the right end plate 149. A retrieving spring 165 surrounding the movable armature 141 and compressed between a collar 167 on the left end of the armature and the left end plate 149 returns the armature 141 and the operating rod structure 93 to the positions shown in FIGS. 8 and 4, respectively, when the solenoid is deenergized.

When the solenoid 143 is energized the armature 141 is attracted to the stationary core and pulls the rod structure 93 toward the right. This actuates the operating lever 89 (FIG. 6) for any one or more of the pole units or phase interrupters to close the contacts of the affected pole or poles of the interrupter. Each of the pole unit mechanisms (FIG. 4) is independently trip-free of the closing rod structure 93. That is, if, during a closing operation the trip device 117 (FIG. 7) for one or more of the pole units functions in response to abnormal circuit conditions in the circuit for that phase the latch 107 will be disengaged from the latch roller 113 thus releasing the trip-free lever 81 of the affected phase interrupter or interrupters permitting the accelerating spring 77 to open the contacts of the affected phase. In this situation the operating lever 89 is held in the closed position by the operating rod structure 93 even though the latch 101 is disengaged from the pin 85, hence, the trip-free lever 81 will pivot about the pin 85 to the fully open position. When the closing solenoid 143 (FIG. 8) is deenergized and the spring 165 returns the operating rod structure 93 to the left the retrieving springs 99 will rotate the closing lever 83 clockwise about its pivot 87 to the FIG. 6 position. This causes the trip-free lever 81 to pivot in a counterclockwise direction about the pins 69 until the latch roller 113 clears the end of the latch 107 which is then returned to its latching position. The phase interrupter is then in condition for a closing operation as was previously described.

Referring now to the circuit diagram (FIG. 9) the phase circuit interrupters A, B and C control corresponding phase load circuits 169a, 169b and 169c each of which is provided with a protective relay schematically shown at 171a, 171b and 171c. Each of the protective relays is operated in response to certain fault conditions such as an overload current or a short circuit current on the associated phase load conductor. The protective relays are provided with normally open contacts 173a, 173b and 173c, respectively, which are connected by conductors 175 in series relation with the tripping electromagnets 117a, 117b and 117c, respectively, and with auxiliary contacts 177a, 177b and 117c, which are closed when the phase interrupters are closed and open when the phase interrupters open. The auxiliary contacts 177a, 177b and 177c are connected by means of a conductor 179 to a supply conductor 181 and the tripping electro-magnets 117a, 117b and 117c are connected to a supply conductor 183 by conductors 185, 187 and 189.

When a fault occurs in any one of the phase conductors 169 the protective relay 171 for that phase closes its contacts 173 and energizes the tripping electromagnet 117 for the faulted phase interrupter over the circuit from the supply conductor 181, conductor 179, auxiliary contacts 177, contacts 173 of the relay, conductor 175, coil of the tripping electromagnet of the faulted phase interrupter and conductors 185, 187 and 189 to the other supply conductor 183.

Energization of the tripping electromagnet 117 for any one or more of the phase interrupters effects high-speed opening of the interrupter for the affected phase only in the previously described manner.

Figure 9:
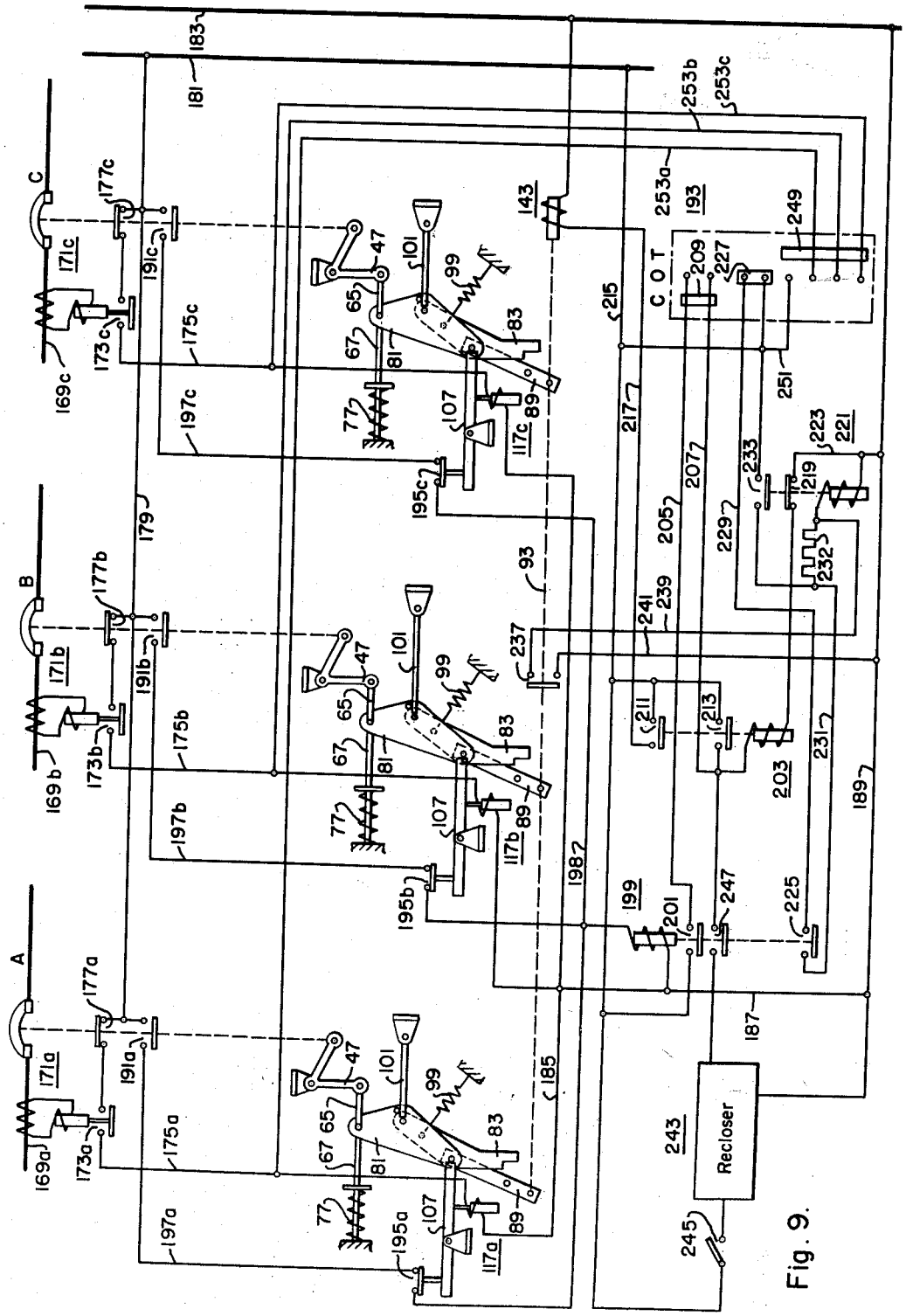
FIG. 9 is a diagrammatic view showing the multiphase circuit interrupter including one form of control circuit for controlling the interrupter.

The phase interrupters are provided with auxiliary contacts 191a, 191b and 191c respectively, which are open when the interrupter is closed and close when the interrupter opens to prepare a circuit for energizing the closing solenoid 143 at least by the time the interrupter reaches the fully open position. The phase interrupter is closed by manual operation of a control switch indicated generally at 193 (FIG. 9). When one of the phase interrupters opens the auxiliary contacts 191 for that interrupter closes and prepares a prepares a circuit over conductor 179, contacts 191, conductor 197, the contacts of a latch check switch 195, a conductor 198, the coil of a relay 199 and the conductors 187 and 189 to the supply conductor 183. The contacts of the latch check switch 195 are opened momentarily when the latch 107 is disengaged from the latch roller 113 by operation of the tripping magnet 117 and are closed to energize the relay 199 when the latch 107 reengages the latch roller at the end of the resetting movement of the trip-free lever 81. Energization of the relay 199 closes its contacts 201 preparing a circuit for energizing a closing relay 203 over conductors 205 and 207. This circuit is normally open at the control switch 193, and is closed by a bridging contact 209 when this switch is momentarily moved to the "close" position indicated at "C" (FIG. 9). Closure of the circuit 205—207 by the bridging contact 209 effects energization of the closing relay 203 which closes its contacts 211 and 213. Closure of the contacts 211 energizes the closing solenoid 143 over a circuit extending from the supply conductor 181 over a conductor 215, contacts 211 of the relay 203, a conductor 217 and the coil of the closing solenoid 143 to the supply line 183. Energization of the closing solenoid 143 closes the phase interrupter or interrupters that have been tripped open in the manner previously described.

The closing relay 203 seals itself in over the contacts 213 to insure that the interrupter will be fully closed before the closing solenoid 143 is deenergized.

The circuit for the closing relay 203 extends through contacts 219 of a release relay 221, a conductor 223 and the conductor 189 to the supply conductor 183. The release relay 221 is provided for dropping out the closing relay 203 at the end of a closing operation and also serves to prevent "pumping" of the interrupter should the interrupter close against a faulted line and the control switch 193 be held in the "close" position. The relay 221 is energized when the relay 199 closes its contacts 225 over a circuit extending from the supply conductor 181, conductor 215, a bridging contact 227 on the control switch 193, conductor 229, contacts 225 of the relay 199, a conductor 231, a resistor 232, coil of relay 221 and conductors 223 and 189 to supply conductor 183. The relay 221 also closes contacts 233 to seal itself in around the contacts 225 of the relay 199 and also around the bridging contact 227.

The closing relay 203 is not immediately energized since the energizing circuit therefor is open at the bridging contact 209, however, the circuits for energizing the closing relay have been prepared. Energization of the closing relay 203 is manually effected by momentarily moving the control switch to the "close" position and then releasing it. The control switch 193 being of the spring return type on release thereof immediately returns to the position shown. Movement of the switch 193 to the "close" position closes the circuit 205—207 at 209 and opens the circuit for the relay 221 at 227. As soon as the bridging contact closes its circuit, the closing relay 203 is energized and effects energization of the closing solenoid 143 as previously described. Opening of the circuit at the bridging contact 227 does not drop out the relay 221 since it is sealed in over its own contacts 233.

As one or more of the phase interrupters reach the closed position, auxiliary contacts 237 on the closing means close shorting out the coil for relay 221 over the circuit 239—241. The relay 221 immediately drops out opening its contacts 219 which effect deenergization of the closing relay 203. The latter opens its contacts 211 thus deenergizing the closing solenoid 143.

If one or more of the phase interrupters should close against a faulted line and the control switch 193 is held in the "close" position, the closing relay 203 will not be energized since its energizing circuit is open at the contacts 219 of the release relay 221 and the latter cannot be energized because its energizing circuit is open at the bridging contact 227. It is, therefore, necessary to release the control switch 193 and permit the switch to return to the "open" position indicated at "O" in FIG. 9. This permits the bridging contact 227 to make up the circuit for energizing the relay 221 which then closes its contacts 219. The control switch 193 is then moved to the "close" position to effect energization of the closing relay as previously described.

The closing operation may be initiated automatically by means of a recloser indicated generally at 243 (FIG. 9), following an opening operation of one or more of the phase interrupters. The recloser 243 may be of a well-known type which automatically effects a predetermined number of reclosing operations. A manual switch 245 is provided for effecting energization of the recloser 243 or for preventing energization of the recloser if automatic reclosing is not desired.

Assuming that the switch 245 is closed, the automatic reclosing operation is effected by the recloser 243 which, upon closure of contacts 247 of the relay 199, which is effected by the auxiliary contacts 191 and the latch-check switch at least by the time the interrupter reaches fully open position, momentarily closes a circuit for energizing the closing relay 203. This circuit extends from the supply conductor 181, conductor 215, switch 245, recloser 243, contacts 247 of relay 199, coil of the closing relay 203, contacts 219 of the release relay to the supply conductor 183. This energizes the closing relay 203 which closes its contacts 211 to energize the closing solenoid 143 and the closing operation is then effected in the previously described manner.

If there is no fault on the circuit controlled by the phase interrupter or interrupters when they are closed they will be latched up as previously described and remain in the closed position. However, if one or more of the phase interrupters close in against a fault they will immediately trip open and the recloser 243 will initiate another reclosing operation. After a predetermined number of reclosing operations the faulted phase interrupter or interrupters will remain in the open position until reclosed by manipulation of the control switch 193 as previously described.

Provision is made to manually trip all of the phase interrupters open simultaneously. A bridging contact 249 on the control switch 193, when the switch is moved to the "trip" position indicated at "T" in FIG. 9, connects the supply conductor 181 over conductor 215 and a conductor 251 to parallel conductors 253a, 253b and 253c which by-pass the protective relay contacts 173a, 173b and 173c respectively and directly energize the tripping electromagnets for the phase interrupters, thus simultaneously energizing all of the tripping magnets and effecting simultaneous opening of all of the phase interrupters.

Each of the phase interrupters comprising the multiphase circuit interrupter is provided with its own trip device responsive to fault condition in the associated phase circuit to trip only the phase interrupter of the affected phase. Each of the phase interrupters has an individual operating mechanism that is mechanically trip-free of the common closing means so that if any one of the phase interrupters is closed in against a fault condition it will open free of the closing means and regardless of the position or energized condition of the closing means.

Having described the invention in accordance with the provisions of the patent statutes, it is to be understood that various changes and modifications may be made in the structural details thereof without departing from the spirit of the invention.

We claim as our invention:

1. In a polyphase circuit interrupter having a phase circuit interrupter for each phase of the circuit, separate trip means operable to effect independent opening of each phase circuit interrupter in response to abnormal circuit conditions in the associated phase circuit, closing means comprising an elongated closing member common to all of said phase circuit interrupters and movable longitudinally to close all of said interrupters, power operated means for operating said elongated common closing member, an individual trip-free connection in each of said phase circuit interrupters between said elongated common closing member and said interrupters, means operable upon opening of any one of said interrupters to cause said power operated means to close said interrupters, and said trip means being responsive to abnormal conditions in any of said phase circuits to cause said trip-free connection to permit opening of the associated interrupter without changing the position of said elongated common closing member.

2. A multiphase circuit interrupter comprising a phase circuit interrupter for each phase of the circuit, horizontally disposed support means supporting said phase circuit interrupters in spaced relation, each of said phase circuit interrupters comprising an insulating casing mounted on top of said support means and extending upwardly therefrom, stationary and movable contact means in each of said insulating casings, a mechanism housing for each phase circuit interrupter mounted on the lower side of said support means below said insulating casings, a closing lever in each of said mechanism housings operable to close the associated phase circuit interrupter, separate trip means for effecting independent opening of each of said phase circuit interrupters, closing means comprising an elongated tension rod structure extending through all of said mechanism housings and movable lengthwise to a closed position to actuate all of said closing levers to close any of said phase circuit interrupters that are open, a mechanically trip-free connection in each of said mechanism housings between each of said closing levers and the associated phase circuit interrupter, and said trip means being operable in response to abnormal circuit conditions in any of said phase circuits to cause said trip-free connection to permit opening of the associated phase circuit interrupter irrespective of the position of said tension rod structure.

3. A polyphase circuit interrupter comprising a phase circuit interrupter for each phase of the circuit, separate trip means for effecting independent opening of each phase circuit interrupter in response to abnormal conditions in the associated phase circuit, an elongated closing rod structure common to all of said phase circuit interrupters, power operated means for moving said closing rod structure longitudinally to close any of said phase circuit interrupters that are open, a closing lever for each of said interrupters operable by said closing rod structure, and an individual trip-free lever for each of said interrupters operatively relating said closing lever to said phase circuit interrupters and operable to effect opening of the associated phase circuit interrupter without a change of position of said closing rod structure.

4. A polyphase circuit interrupter comprising a phase circuit interrupter for each phase of the circuit, separate trip means for effecting independent opening of each phase circuit interrupter in response to abnormal conditions in the associated phase circuit, closing means comprising an elongated power operated member common to all of said phase circuit interrupters and movable lengthwise to close any of said phase circuit interrupters that are open, a separate operating mechanism for each of said phase circuit interrupters operable by said common power operated member to close the associated phase circuit interrupter, and separate trip-free means for each of said phase operating mechanisms operable in response to abnormal conditions occurring in the associated phase circuit during a closing operation to effect opening of the associated phase circuit interrupter irrespective of the position of said common power operated closing member.

5. A polyphase circuit interrupter comprising a phase circuit interrupter for each phase of the circuit, separate trip means for effecting independent opening of each phase circuit interrupter in response to abnormal conditions in the associated phase circuit, closing means comprising an elongated tension rod structure extending across all of said phase circuit interrupters and movable lengthwise to close any of said phase circuit interrupters that are open, electromagnetic means operable when energized to actuate said tension rod structure, a separate operating mechanism for each of said phase circuit interrupters operable by movement of said tension rod structure to close the associated phase circuit interrupter, and each of said phase operating mechanisms including a mechanically trip-free member operable in response to abnormal conditions occurring in the associated phase circuit during a closing operation to effect opening of the associated phase circuit interrupter irrespective of the energized condition of said electromagnetic means.

References Cited in the file of this patent

UNITED STATES PATENTS

| | | |
|---|---|---|
| 1,969,576 | Paxton | Aug. 7, 1934 |
| 2,315,585 | Bostwick | Apr. 6, 1943 |
| 2,333,459 | Atwood | Nov. 2, 1943 |
| 2,411,366 | Chubbuck | Nov. 19, 1946 |
| 2,476,076 | Walle | July 12, 1949 |
| 2,567,411 | Van Ryan | Sept. 11, 1951 |